United States Patent
Gomi

(10) Patent No.: US 8,021,011 B2
(45) Date of Patent: Sep. 20, 2011

(54) LIGHT-EMITTING DEVICE AND DISPLAY DEVICE

(75) Inventor: Shuji Gomi, Icihara (JP)

(73) Assignee: Showa Denko K.K., Tokyo (JP)

( * ) Notice: Subject to any disclaimer, the term of this patent is extended or adjusted under 35 U.S.C. 154(b) by 80 days.

(21) Appl. No.: 12/301,175

(22) PCT Filed: Apr. 15, 2008

(86) PCT No.: PCT/JP2008/057354
§ 371 (c)(1),
(2), (4) Date: Nov. 17, 2008

(87) PCT Pub. No.: WO2008/146544
PCT Pub. Date: Dec. 4, 2008

(65) Prior Publication Data
US 2010/0172123 A1    Jul. 8, 2010

(30) Foreign Application Priority Data

May 25, 2007    (JP) ................................ 2007-139633

(51) Int. Cl.
*F21V 5/04* (2006.01)

(52) U.S. Cl. ............... 362/97.3; 362/311.02; 362/311.1; 362/311.14

(58) Field of Classification Search ........... 362/97.1, 362/97.2, 97.3, 97.4, 249.02, 249.06, 311.02, 362/311.06, 311.1, 311.14, 311.15, 335, 362/612, 613
See application file for complete search history.

(56) References Cited

U.S. PATENT DOCUMENTS

| 7,641,352 B2 * | 1/2010 | Lin et al. ....................... 362/612 |
| 2005/0067944 A1 | 3/2005 | Masuda et al. |
| 2006/0186425 A1 | 8/2006 | Yano et al. |
| 2007/0070616 A1 | 3/2007 | Segawa |
| 2007/0081323 A1 * | 4/2007 | Yun et al. ........................ 362/97 |
| 2008/0080180 A1 * | 4/2008 | Messina et al. ............... 362/311 |

FOREIGN PATENT DOCUMENTS

| JP | 10-12926 A | 1/1998 |
| JP | 2005-175417 A | 6/2005 |
| JP | 2005-243347 A | 9/2005 |
| JP | 2007-115663 A | 5/2007 |
| WO | 2005/073621 A1 | 8/2005 |

* cited by examiner

Primary Examiner — Y My Quach Lee
(74) Attorney, Agent, or Firm — Sughrue Mion, PLLC

(57) ABSTRACT

The display device is provided with: a display panel that displays an image; a circuit board 20 that is disposed on a back surface of the display panel; a plurality of LED chips 21 that are disposed in an array on the circuit board 20 and that emit light to the display panel; and a lens 30 of a hemispherical shape that is disposed on the circuit board 20 and that covers each of the plurality of LED chips 21. A following relationship is established: $R_1/0.281 \leq L_1$, where $L_1$ denotes an array pitch of LED chips 21 constituting the plurality of LED chips 21, and $R_1$ denotes a radius of the lens 30. Accordingly, a light-emitting device achieving a high degree of light utilization efficiency and an excellent degree of color mixing, and a display device using the light-emitting device are provided.

5 Claims, 5 Drawing Sheets

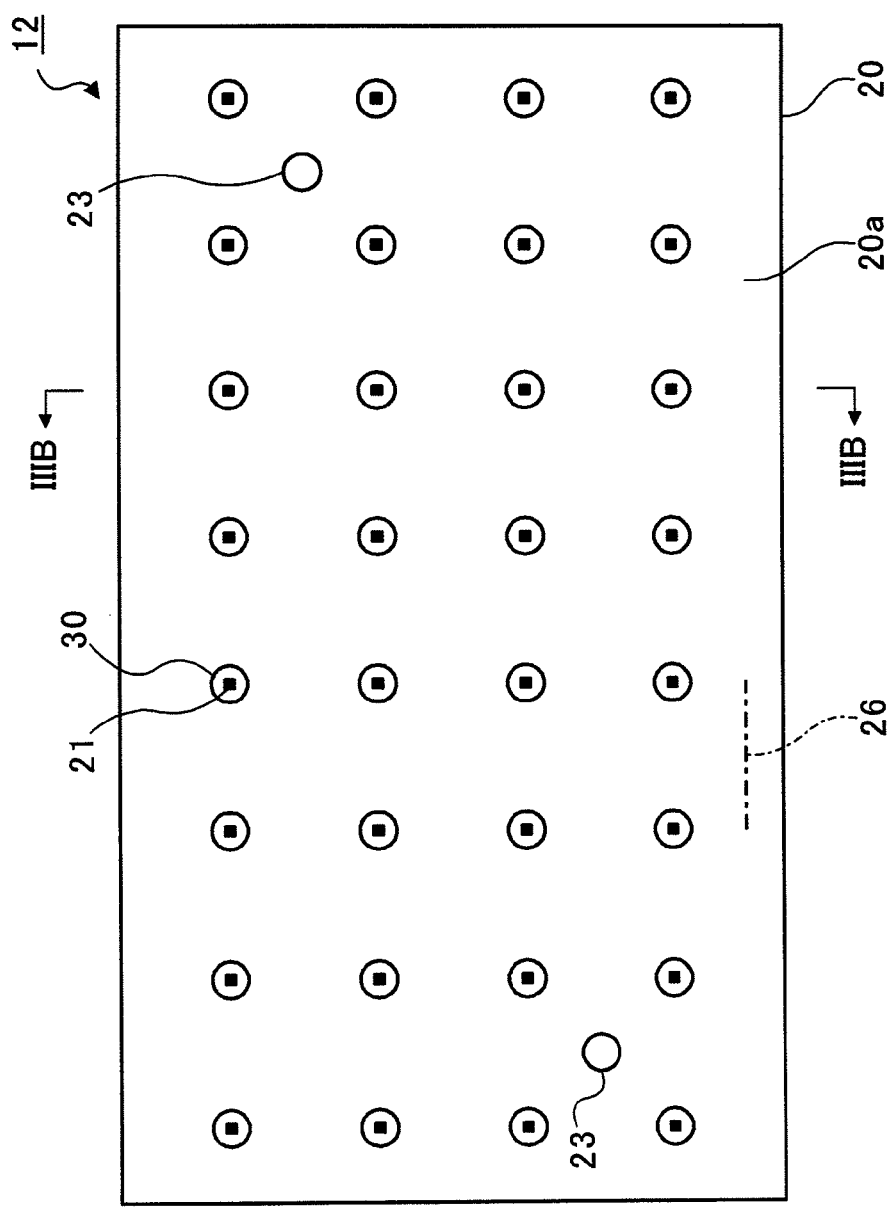

LIGHT-EMITTING DEVICE AND DISPLAY DEVICE

TECHNICAL FIELD

The present invention relates to light-emitting devices and display devices. More specifically, it relates to a light-emitting device including solid-state light-emitting elements, and a display device using the light-emitting device.

BACKGROUND ART

In recent years, various light-emitting devices in which plural solid-state light-emitting elements such as light-emitting diodes (LEDs) are mounted on a substrate for use as a light source have come into practical use. Such light-emitting devices are widely used, for example, as a matrix display device in which a matrix of plural LEDs emits light selectively to display characters or images, a backlight for a liquid crystal panel of a liquid crystal display device, or the like.

As the related art disclosed in one official gazette, there is one in which RGB LED chips each having a lens correspondingly provided thereon are disposed in proximity to corner portions of an equilateral triangle, respectively, in order to achieve a high-density array and, a light emitting display surface with high brightness and clearness (refer to Patent Document 1, for example).

Also, in the art disclosed in another official gazette, in order to suppress unevenness of color of illuminating light emitted from an end of a lighting unit or from between adjacent lighting units, a light source having the same luminescent color as that obtained by the mixing of light from light sources possessed by the lighting unit is disposed at the end of the light source or between the adjacent lighting units (refer to Patent Document 2, for example).

In addition, in the art disclosed in still another official gazette, in order to produce an array of light-emitting elements that achieves a narrow angle of divergence of a beam of light emitted from the light-emitting element and also that does not allow occurrence of flare light, the following relationship is established:

$$0.5 \leq (P-D)/(D/2) \leq 1.5,$$

where P denotes an array pitch of the array of the light-emitting elements, and D denotes a diameter of a microlens (refer to Patent Document 3, for example).

Patent Document 1: Japanese Patent Application Laid Open Publication No. 10-12926
Patent Document 2: Japanese Patent Application Laid Open Publication No. 2005-243347
Patent Document 3: Japanese Patent Application Laid Open Publication No. 2005-175417

DISCLOSURE OF THE INVENTION

Problems to be Solved by the Invention

Here, as for a light-emitting device with a substrate having an array of plural solid-state light-emitting elements mounted thereon, it has been considered to cover each of the solid-state light-emitting elements mounted on the substrate, with a transparent cover member. The cover member is used, for example, to protect or seal the solid-state light-emitting element or to refract, in a desired direction, an optical path of light emitted from the solid-state light-emitting element. The conventional light-emitting device using the solid-state light-emitting elements has, for example, a close arrangement of solid-state light-emitting elements and lenses, thereby offering high brightness and sufficient color mixing characteristics. However, a close arrangement of a large number of elements and lenses leads to a lot of components and also a large number of man-hours for assembling, resulting in high cost. The close arrangement also requires high power consumption and hence requires the provision of a mechanism for sufficient heat radiation.

Also, to address these problems, it is conceivable to insert a white (W) light-emitting element using a phosphor, for example, around an array of RGB solid-state light-emitting elements so as to reduce the total number of solid-state light-emitting elements. However, the white light-emitting element alone uses the phosphor, and thus, the lifetime of the white light-emitting element does not coincide with those of other elements, which makes it difficult to handle a light-emitting device. Also, a circuit becomes complicated, and further, unevenness of brightness caused by the white light-emitting element alone having different brightness becomes a problem.

The present invention has been made against the background of the above-mentioned art. An object of the present invention is to provide a light-emitting device achieving a high degree of light utilization efficiency and an excellent degree of color mixing, and a display device using the light-emitting device.

Another object of the present invention is to provide a display device adopting, for example, a direct-lighting type backlight, which is excellent in front brightness.

Still another object of the present invention is to provide a display device and the like in which 96% of light is not theoretically attenuated by adjacent cover members, in the case where the display device is formed of an array of solid-state light-emitting elements each covered with a cover member of hemispherical shape.

Means for Solving the Problems

In order to address the above problems, there is provided a display device to which the present invention is applied including: a display panel that displays an image; a substrate that is disposed on a back surface of the display panel; a plurality of solid-state light-emitting elements that are disposed in an array on the substrate and that emit light to the display panel; and a cover member of a hemispherical shape that is disposed on the substrate and that covers each of the plurality of solid-state light-emitting elements. A following relationship is established:

$$R/0.281 \leq L,$$

where L denotes an array pitch of solid-state light-emitting elements in the closest proximity to each other, constituting the plurality of solid-state light-emitting elements, and R denotes a radius of the cover member.

Here, the display device is further provided with a diffusion plate that is disposed between the display panel and the substrate and that diffuses light emitted from the plurality of solid-state light-emitting elements. A following relationship is established:

$$R/0.281 \leq L \leq D/2,$$

where D denotes a shortest distance between the plurality of solid-state light-emitting elements and the diffusion plate.

According to another aspect of the present invention, there is provided a display device to which the present invention is applied including: a display panel that displays an image; a substrate that is disposed on a back surface of the display panel; a plurality of solid-state light-emitting elements that are disposed in an array on the substrate and that emit light to the display panel; and a cover member of a hemispherical shape that is disposed on the substrate and that covers each of the plurality of solid-state light-emitting elements. A solid-state light-emitting element and an adjacent solid-state light-emitting element that is adjacent to the solid-state light-emitting element, which constitute the plurality of solid-state light-emitting elements, has a following relationship:

$$\varphi \leq 16.3°,$$

where $\varphi$ denotes an angle formed between a line segment that links a center of the solid-state light-emitting element and a center of the adjacent solid-state light-emitting element, and a line segment tangent to the cover member of the adjacent solid-state light-emitting element, which is drawn from the center of the solid-state light-emitting element.

In the present invention from a standpoint of a light-emitting device, there is provided a light-emitting device to which the present invention is applied including: a substrate; a plurality of solid-state light-emitting elements that are disposed in an array on the substrate; and a cover member of a hemispherical shape that is disposed on the substrate and that covers each of the plurality of solid-state light-emitting elements. A following relationship is established:

$$R/0.281 \leq L,$$

where L denotes an array pitch of solid-state light-emitting elements constituting the plurality of solid-state light-emitting elements, and R denotes a radius of the cover member.

According to further aspect of the present invention, there is provided a light-emitting device to which the present invention is applied including: a substrate; a plurality of solid-state light-emitting elements that are disposed in an array on the substrate; and a cover member of a hemispherical shape that is disposed on the substrate and that covers each of the plurality of solid-state light-emitting elements. A solid-state light-emitting element and an adjacent solid-state light-emitting element that is adjacent to the solid-state light-emitting element, which constitute the plurality of solid-state light-emitting elements, has a following relationship:

$$\varphi \leq 16.3°,$$

where $\varphi$ denotes an angle formed between a line segment that links a center of the solid-state light-emitting element and a center of the adjacent solid-state light-emitting element, and a line segment tangent to the cover member of the adjacent solid-state light-emitting element, which is drawn from the center of the solid-state light-emitting element.

Incidentally, it is to be understood that the term "hemispherical shape" as employed in the present invention is not limited to referring to a mathematically perfect hemisphere, and is not intended to exclude what is recognized to be close to a hemisphere in terms of manufacture and practical use.

Advantages of the Invention

According to the present invention, it is possible to provide a light-emitting device achieving a high degree of light utilization efficiency and an excellent degree of color mixing, and a display device using the light-emitting device.

BEST MODES FOR CARRYING OUT THE INVENTION

Hereinafter, exemplary embodiments of the present invention will be described in detail with reference to the accompanying drawings.

FIG. 1 is a view showing an entire configuration of a liquid crystal display device to which an exemplary embodiment is applied. The liquid crystal display device to which the present exemplary embodiment is applied includes a liquid crystal display module 50 having a display panel, and a backlight device 10 as a light-emitting device emitting light to the liquid crystal display module 50, which is provided on a back surface of the liquid crystal display module 50 (a lower side in the FIG. 1).

The backlight device 10 includes a backlight frame 11 that contains a light-emitting portion, and a light-emitting module 12 on which plural light emitting diodes (referred to as LEDs in the following description) are arrayed. Moreover, the backlight device 10 includes, as a laminated body of optical films, a diffusion plate 13 that is a plate (or a film) scattering and diffusing light to equalize the lightness over the entire surface, and prism sheets 14 and 15 that have a light collection effect to the front. In addition, the backlight device 10 includes a brightness improvement film 16 with a diffusion and reflection type, for improving the brightness.

On the other hand, the liquid crystal display module 50 includes a liquid crystal panel 51 as one type of a display panel that is configured by two glass substrates sandwiching liquid crystal in between, and polarization plates 52 and 53 for restricting the oscillation of optical wave to a given direction, which are each laminated on each glass plate of the liquid crystal panel 51. The liquid crystal display device includes peripheral members (not shown in the figure) such as an LSI (Large Scale Integration) for driving, mounted thereon.

For example, the liquid crystal panel 51 as a display panel in a limited sense includes various components not shown in the figure. For example, the two glass plates have display electrodes, active elements such as a thin film transistor (TFT), liquid crystal, a spacer, sealant, an orientation film, a common electrode, a protective film, a color filter, and others, none of which is shown in the figure.

The structural unit of the backlight device 10 as a light-emitting device is selected in an arbitrary way. For example, the unit including only the backlight frame 11 with the light-emitting module 12 may be called as the "backlight device (backlight)" and distributed as a "light-emitting device" not including the laminated body of the optical films such as the diffusion plate 13 and the prism sheets 14 and 15.

FIGS. 2A and 2B are views for explaining a partial structure of the backlight device 10. FIG. 2A is a top view of the backlight frame 11 on which the light-emitting modules 12 are mounted, which is seen from the liquid crystal display module 50 shown in FIG. 1, and FIG. 2B is a cross sectional view taken along a line IIB-IIB in FIG. 2A. An instance shown in FIGS. 2A and 2B indicates a direct-lighting type backlight configuration in which light sources are disposed directly beneath the backside of the liquid crystal display module 50. In this backlight configuration, LED chips 21 are arrayed in such a manner that they are almost uniformly distributed over the entire back surface of the liquid crystal display module 50.

The backlight frame 11 has a chassis structure made of, for example, aluminum, magnesium, iron, or a metallic alloy including these materials. To the inside of the chassis structure, a polyester film or the like having a high performance of reflecting white light is adhered, for example. It also functions as a reflector. The chassis structure is composed of a rear portion 11a corresponding to the size of the liquid crystal display module 50 and side portions 11b enclosing the four sides of the rear portion 11a. On the rear portion 11a, a heat radiating sheet 18 may be provided.

In an instance shown in FIG. 2A, there are provided plural light-emitting modules 12 (e.g., eight light-emitting modules 12 as employed in this instance). Incidentally, the light-emitting modules 12 may be regarded as one of the light-emitting devices to be dealt independently. Then, the light-emitting modules 12 are each fixed to the backlight frame 11 by plural screws 17 (e.g., two screws 17 for each light-emitting module 12, as employed in this instance) through the heat radiating sheet 18. Incidentally, a silicone rubber sheet having a multilayer structure with insulating properties, for example, may be used as the heat radiating sheet 18.

The light-emitting module 12 includes a circuit board 20, and plural LED chips 21 (e.g., 32 LED chips 21 as employed in this instance) mounted on the circuit board 20. The plural LED chips 21 as one type of solid-state light-emitting elements, are formed of red, green and blue LED chips that emit red light, green light and blue light, respectively, and the red, green and blue LED chips 21 are arranged in accordance with a given rule. Mixing of light emitted from the red, green and blue LED chips 21 achieves a light source having a wide range of color reproduction. Incidentally, the LED may include one or more LED chips 21 that each emit red, green or blue light, or a pseudo-white solid-state light-emitting element that emits pseudo white light by a combination of a single LED chip 21 that emits blue-violet light and a phosphor may be used as the LED. Further, the LED may be configured to include plural LED chips 21 that emit red, green and blue light, respectively, positioned close to each other so as to emit white light.

When the plural light-emitting modules 12 are mounted on the backlight frame 11, the LED chips 21 are uniformly disposed throughout the structure of the backlight. Also, the overall advantageous effect of the LED chips 21 present on the backlight frame 11 provides a backlight device 10 that achieves the uniformity of brightness and chromaticity. Incidentally, in an instance shown in FIGS. 2A and 2B, the plural light-emitting modules 12 are used; however, all LED chips 21 to be used as a light source of the backlight may be collectively combined into one substrate of a single light-emitting module 12.

Each individual LED chip 21 disposed on the light-emitting module 12 is provided with a lens (cap) 30 as a cover member. The lens 30 is disposed so as to cover each individual LED chip 21 and is fixed to the circuit board 20. Each lens 30 has functions of protecting each LED chip 21 and also efficiently and uniformly guiding light emitted from the corresponding LED chip 21 to a liquid crystal display module 50 (refer to FIG. 1).

FIGS. 3A and 3B show a detail configuration of the light-emitting module 12 in the present exemplary embodiment. FIG. 3A is a top view of the circuit board 20 on which the LED chips 21 are mounted and the lenses 30 are attached thereto, and FIG. 3B is a cross sectional view taken along a line IIIB-IIIB in FIG. 3A.

The circuit board 20 includes wiring 26 supplying power to the LED chips 21 mounted on the circuit board 20. Incidentally, the wiring 26 is disposed inside the circuit board 20 and is partially illustrated in the figure. The circuit board 20 has two terminals (not shown in the figure) formed thereon, and the power is supplied from the two terminals through the wiring 26 to all LED chips 21. Moreover, by the wiring 26, at least two LED chips 21 mounted on the circuit board 20 are series-connected or parallely-connected to each other. Incidentally, each LED chip 21 and the wiring 26 are electrically connected by a bonding wire (not shown in the figure). The circuit board 20 is rectangular in shape. In the present exemplary embodiment, a so-called glass-epoxy substrate having a glass-cloth-based epoxy resin as a base is used as the circuit board 20. Also, the circuit board 20 is provided with two screw holes 23 for the screws 17 as mounting members.

The lens 30 has a hemispherical shape and is disposed so that its top is located to the upper portion of the corresponding LED chip 21. Incidentally, the lens 30 is made of a silicone resin or an epoxy resin having substantially transparent optical properties in a visible region, and the inside of lens 30 is filled with the silicone resin. The formation of the lens 30 is accomplished by supplying, from a surface 20a side, the silicone resin on one surface, namely, the surface 20a, of the circuit board 20 on which the LED chips 21 are mounted, and by molding the supplied silicone resin. Thus, the lens 30 is adhesively bonded to the surface 20a of the circuit board 20.

A description will be given with regard to a method for arraying the lenses 30 adopted in the present exemplary embodiment.

Generally, if the lens 30 that is a convex lens has a hemispherical shape, light from the LED chip 21 protected by the lens 30 is not refracted, and attenuation of power is reduced. In the present exemplary embodiment, further, detailed consideration will be made with regard to an arrangement of plural LED chips 21 of different luminescent colors and the lenses 30 therefor, for example.

First, the inventors have made discussion, starting with the following proposition:

"A preferable array pitch is derived from the radius of the lens determined from the LED (chip), a theoretical luminous intensity distribution and an allowable attenuation rate."

At this time, the inventors have set the following goal in accordance with an experimental rule, in order to improve the brightness of luminous source and reduce unevenness of color. Incidentally, for this goal, it is assumed that light entering the adjacent lenses 30 is refracted or reflected.

The goal is as follows:

"In the luminous source in which at least RGB LEDs are used as one dot, the shape of the lens 30 that covers the LED chip 21 and the distance between the LED chips 21 are defined so that theoretically 96% of light exits upward (specifically, toward the liquid crystal display module 50) without attenuating."

Here, the reason for a theoretical attenuation of 4% is, when attenuation is less than approximately 4%, it is difficult to design a configuration that suppresses unevenness of brightness or unevenness of color. Meanwhile, when attenuation is more than approximately 4%, the merit of optical properties is reduced. The value, 4%, is obtained on the basis of the experimental rule through the inventors' studies.

FIGS. 4A to 4C are views for explaining a theory considered and adopted by the inventors in order to achieve the above goal. FIG. 4A is a representation of Lambert's cosine law used as the theoretical luminous intensity distribution, FIG. 4B is a two-dimensional representation of FIG. 4A, and FIG. 4C shows a cosine curve showing radiant intensity I ($\phi$).

First, under a condition that the LED chip 21 as the light source is a point source of light, when radiant intensity in a direction perpendicular to the plane of the light source is referred to as $I_0$, radiant intensity I in a direction forming an angle $\phi$ with a plane normal as shown in FIG. 4A is expressed by the following Lambert's cosine law:

$$I = I_0 \cos \phi.$$

Also, it is assumed that the shape of the lens 30 is designed as a hemispherical lens that does not refract and reflect light emitted from the LED chip 21 protected by the lens 30 at all.

These are used as the theoretical luminous intensity distribution.

Incidentally, the Lambert's cosine law provides that radiant flux per unit solid angle from a given direction is proportional to the cosine of the angle between the normal to this plane and the given direction. According to this law, the reflection from a perfect diffusing plane or the radiant intensity in a predetermined radiant direction changes according to the cosine of the angle between the normal to this plane and the predetermined direction.

The luminous intensity distribution shown in FIG. 4A is rotationally symmetrical about the plane normal, and is thus shown as a circle graph as shown in FIG. 4B in the two-dimensional representation for sake of clarity. Further, the luminous intensity distribution is shown as the cosine curve shown in FIG. 4C, in which the x axis (or the horizontal axis) indicates the angle $\phi$, and the y axis (or the vertical axis) indicates the radiant intensity I ($\phi$). Incidentally, the unit of the radiant intensity I ($\phi$) is (W/sr) (where W denotes the radiant flux, and sr denotes the unit solid angle). Also, the angle $\phi$ is:

$$-90° \leq \phi \leq 90°.$$

In the cosine curve $$I(\phi) = I_0 \cos \phi$$

shown in FIG. 4C, the hatched areas at both ends each represent 2% of the region, or when both ends are added, the hatched areas represent 4% of the region, which is a theoretical attenuation portion in the present exemplary embodiment. The boundaries are each set to $\phi_{98}$. The other region is 96%, which is a portion in which no attenuation occurs theoretically.

Here, a relationship in FIG. 4C is expressed by a following equation:

$$\frac{I_0 \int_{-\phi_{98}}^{\phi_{98}} \cos\phi \, d\phi}{I_0 \int_{-90°}^{90°} \cos\phi \, d\phi} = 0.96 \quad \text{[Equation 1]}$$

In the equation 1, 0.96 on the right side denotes 96%.

When the left side of the above equation 1 is solved and simplified, the following equation is obtained:

$$\sin\phi_{98} = 0.96 \quad \text{[Equation 2]}$$

$$\phi_{98} = \sin^{-1} 0.96 \approx 73.7°$$

FIGS. 5A and 5B are views for explaining the relationship between the lenses 30 adjacent to each other. In FIG. 5A, there are shown a predetermined LED chip 21-1, and a lens 30-1 as the cover member to cover the predetermined LED chip 21-1, which are formed on the circuit board 20. Also there are shown an adjacent LED chip 21-2 that is an adjacent solid-state light-emitting element adjacent to the predetermined LED chip 21-1, and a lens 30-2 that covers the adjacent LED chip 21-2.

An angle of 16.3° is obtained by subtracting the angle $\phi_{98}$ equal to 73.7° ($\phi_{98}$=73.7°) calculated by the above equation 2 from a right angle 90°. This angle indicates an angle formed between a line segment that links a center of the predetermined LED chip 21-1 (the center on the surface 20a of the circuit board 20) and a center of the adjacent LED chip 21-2 (the center on the surface 20a of the circuit board 20), and a line segment tangent to the lens 30-2 covering the adjacent LED chip 21-2, which is drawn from the center of the predetermined LED chip 21-1, in a relationship between the predetermined LED chip 21-1 and the adjacent LED chip 21-2. Here, if an angle $\phi$ is $$\phi \leq 16.3°,$$

it is possible to reduce the influence of refraction or reflection of light entering the adjacent lenses 30 upon the adjacent LED chips 21. In an instance shown in FIG. 5A, this relationship is applied to the relationship between the predetermined LED chip 21-1 and the lens 30-2 adjacent thereto and to the relationship between the adjacent LED chip 21-2 and the lens 30-1 adjacent thereto. In other words, the application of the above relationship theoretically allows 96% of light emitted from the LED chip 21 to exit to the liquid crystal display module 50 disposed upward, without attenuation, when the lens 30 has a hemispherical shape.

FIG. 5B is a view for explaining the relationship between the LED chips 21 adjacent to each other and the lenses 30 adjacent to each other. Here, $L_1$ denotes an array pitch of the LED chips 21 adjacent to each other, $R_1$ denotes a radius of the lens 30 as the cover member, and $\phi_1$ denotes an angle formed between a line segment that links the centers of the LED chips 21 adjacent to each other (the centers on the surface 20a of the circuit board 20) and a line segment tangent to the adjacent lens 30, which is drawn from the center of one of the LED chips 21 (the center on the surface 20a of the circuit board 20).

A following equation expresses a relationship between $L_1$, $R_1$ and $\phi_1$:

$$\sin\phi_1 = \frac{R_1}{L_1} \quad \text{[Equation 3]}$$

Here if $\phi_1$=90°−73.7° is applied to the above equation 3 on the basis of the angle $\phi_{98}$=73.7° calculated by the above equation 2, the following equation is obtained:

$$\sin(90° - 73.7°) = \frac{R_1}{L_1} \quad \text{[Equation 4]}$$

$$\sin 16.3° = \frac{R_1}{L_1}$$

$$0.281 = \frac{R_1}{L_1}$$

According the the above equation 4, when the radius $R_1$ of the lens 30 and the array pitch $L_1$ of the LED chips 21 are defined so that the array pitch $L_1$ of the LED chips 21 is more than a value obtained by dividing the radius $R_1$ of the lens 30 by 0.281, that is, $$R_1/0.281 \leq L_1,$$

theoretically 96% of light emitted from the LED chips 21 is guided to the diffusion plate 13 (refer to FIG. 1) closer to the liquid crystal display module 50, without attenuation. In other words, this allows the minimization of refraction by the adjacent lens 30, and thus attenuation of light power and unevenness of color are suppressed.

On the other hand, the results of optical simulations made by the inventors have shown that, in order to achieve sufficient color mixing, the distance (namely, the light source-to-diffusion plate distance) D between the LED chip 21 as the light source and the diffusion plate 13 (refer to FIG. 1) that receives light from the LED chip 21 must be two times or more than the distance $L_1$ between the LED chips 21 adjacent to each other. This relationship leads to the following relationship:

$$R_1/0.281 \leq L_1 \leq D_1/2,$$

where $D_1$ denotes a shortest distance (or light source-to-diffusion plate distance) between the LED chip 21 and the diffusion plate 13. Maintaining this relationship allows enhancing the efficiency of light utilization, and provides an array method that has excellent front brightness and excellent degree of color mixing.

Incidentally, in FIGS. 5A and 5B, "the centers on the surface 20a of the circuit board 20" are employed as the centers of the LED chips 21 for use in the simulations. The height of the chip is negligible as an error without problems; however, for example, the plane of a top layer portion (or a top surface portion) of the LED chip 21 may be taken into account, and the center of the plane may be used as the reference. For example, if the height of a blue (B) and green (G) chips is set to about 90 μm and if the height of a red (R) chip is set to about 300 μm, the hemispherical lens 30 can be formed on a plane shifted toward the upper part of the figure according to the height of each of these chips. In such a case, the lens 30 may have a bullet shape as a whole, having a cylindrical shape in a shifted portion of about 90 or 300 μm, and having a hemispherical shape on the portion above the shifted plane.

EXAMPLES

A rectangular array of a total of 3200 LEDs is configured as a backlight device for a 40-inch liquid crystal display panel under the following conditions: 6000 cd/m², 150 watts of power, and the numbers of luminescent RGB colors are in the ratio R:G:B=1:2:1. As employed in this instance, the LED (e.g., the LED chip 21) is what is called a small chip, which is 0.35 by 0.35 millimeters square, and the radius R of a hemispherical lens is 2 mm. Then, the LEDs are arrayed with a pitch L=10 mm that satisfies $7.12 \leq L$ obtained from $$R/0.281 \leq L.$$

Further, plural LEDs of different luminescent colors are arrayed with the pitch. Also, the light source-to-diffusion plate distance is set equal to 50 mm.

As is apparent from observation of the above backlight device, the light utilization efficiency is enhanced, and thereby the device excellent in front brightness is provided. Further, the backlight device having an excellent degree of color mixing is also provided.

Incidentally, in general, the radius $R_1$ of the hemispherical lens 30 is physically determined by a region formed by the size of the LED chip 21, the size of a second wire bonding pad and the height of a wire. For example, if the LED chip 21 of two-wire type, which is 0.35 by 0.35 millimeters square, is used, the minimum radius $R_1$ is about 1.5 mm.

Also, if the light source-to-diffusion plate distance is set equal to 50 mm, it is preferable that the pitch is equal to or less than 25 mm, on the basis of the above results of optical simulations.

When this relationship is applied to the equation 4, the following relationship is established:

$$R_1 = 7.03 \text{ mm if } L_1 = 25 \text{ mm and}$$

$$L_1 = 5.34 \text{ mm if } R_1 = 1.5 \text{ mm}.$$

Therefore, individual hemispherical lenses are separated from each other. Further, in $$1.5 \leq \text{lens radius } R_1 \leq 7.03 \text{ and}$$

$$5.31 \leq \text{array pitch } L_1 \leq 25,$$

a combination of $R_1$ and $L_1$ that satisfies $R/0.281 \leq L$ and $\phi \leq 16.3°$ is selected to enhance the light utilization efficiency and provide the display device excellent also in the degree of color mixing.

BRIEF DESCRIPTION OF THE DRAWINGS

FIGS. 3A and 3B are views showing a detail configuration of the light-emitting module in the present exemplary embodiment;

DESCRIPTION OF REFERENCE NUMERALS AND SIGNS

Figure 1:
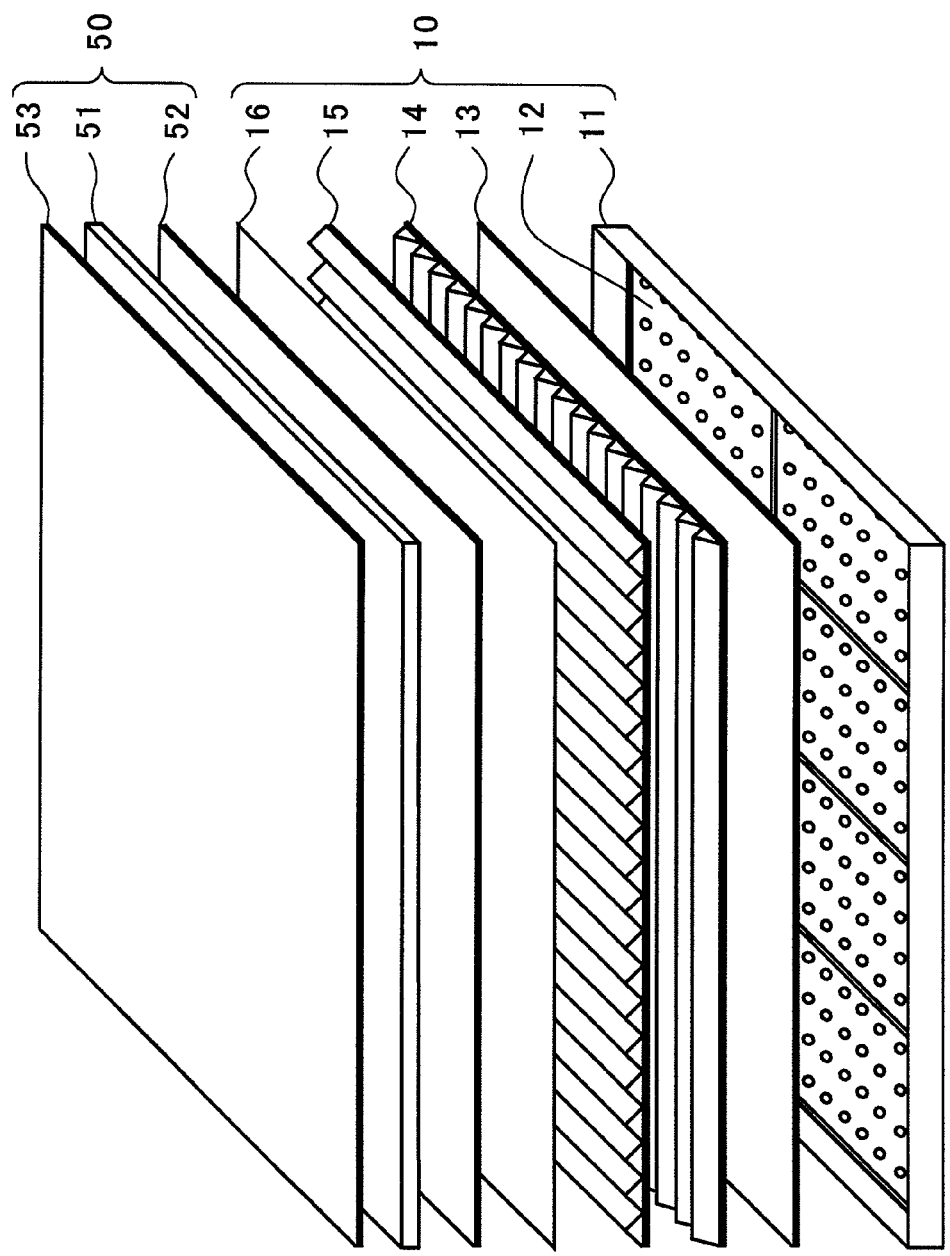
FIG. 1 is a view showing an entire configuration of a liquid crystal display device to which an exemplary embodiment is applied.
Figure 2A:
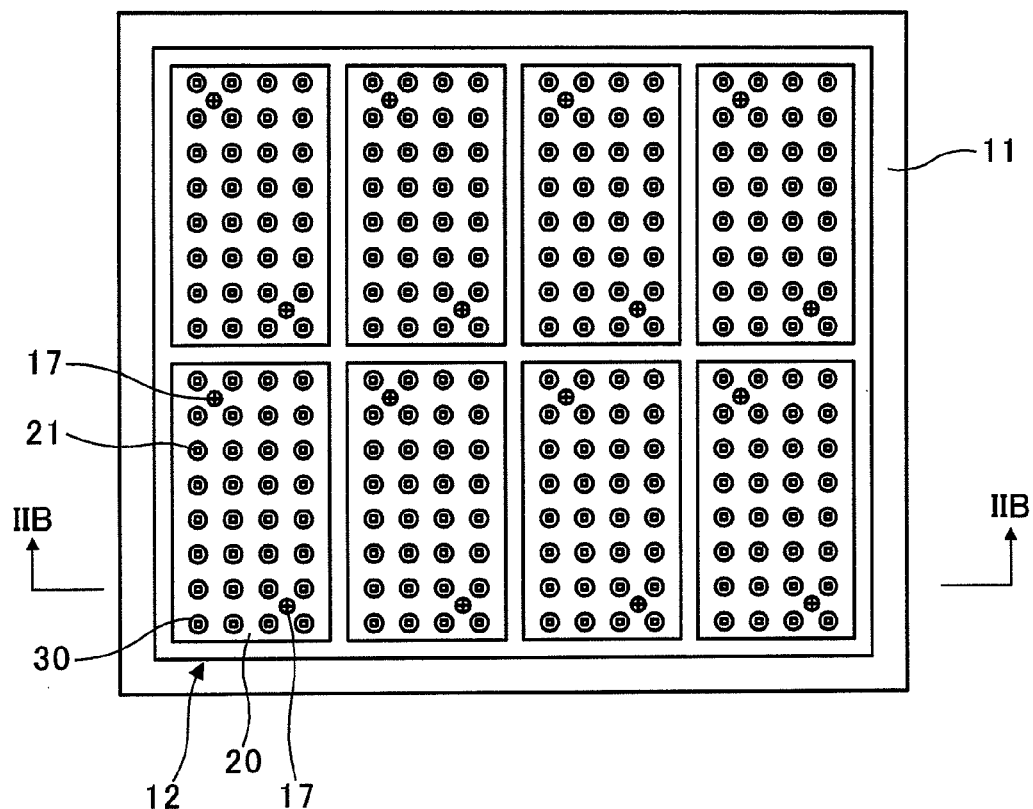
FIGS. 2A and 2B are views for explaining a partial structure of the backlight device.
Figure 2B:
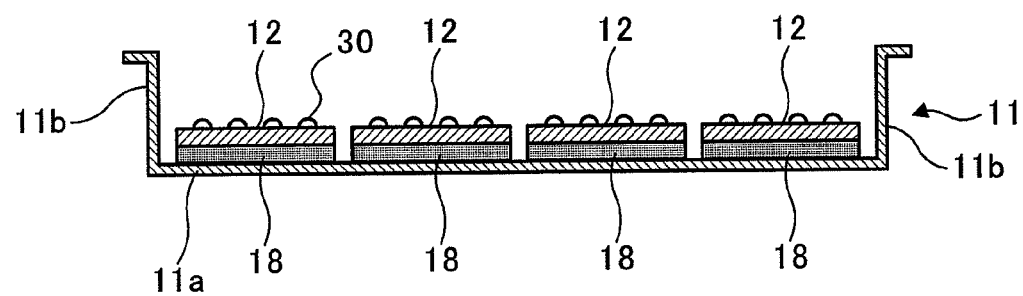
Figure 4A:
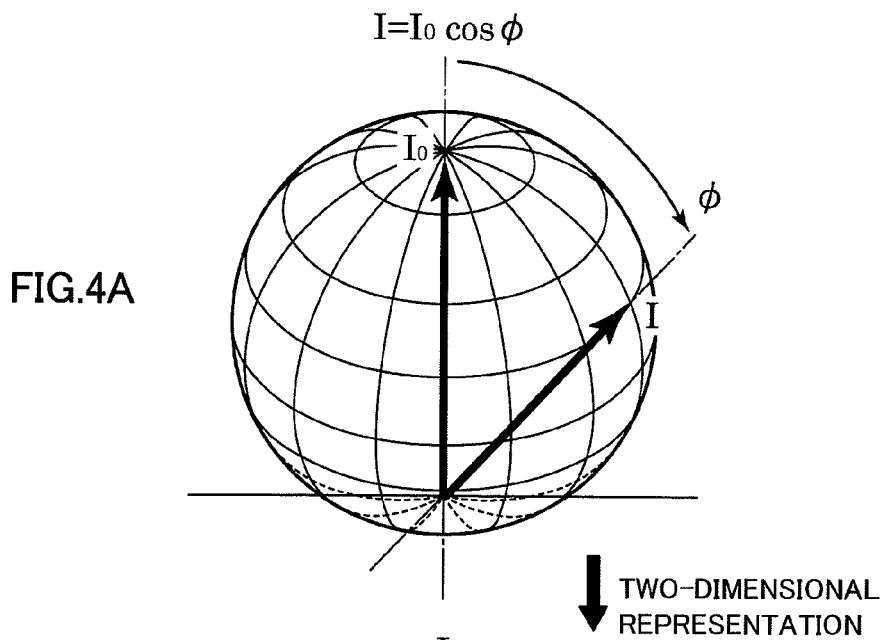
FIGS. 4A to 4C are views for explaining a theory considered and adopted by the inventors.
Figure 4B:
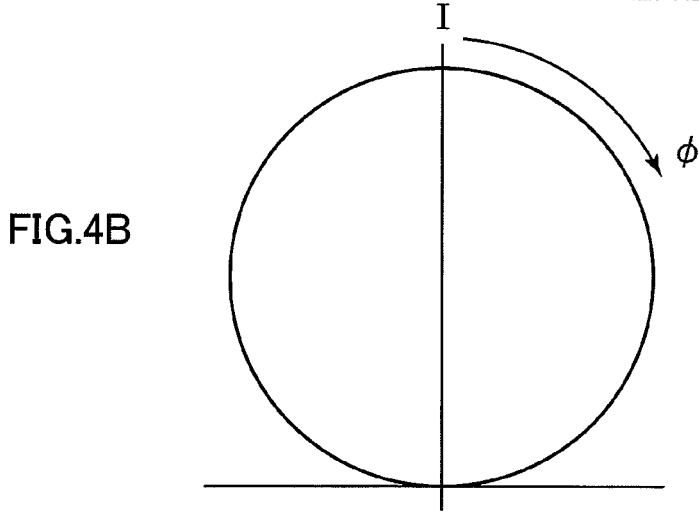
Figure 4C:
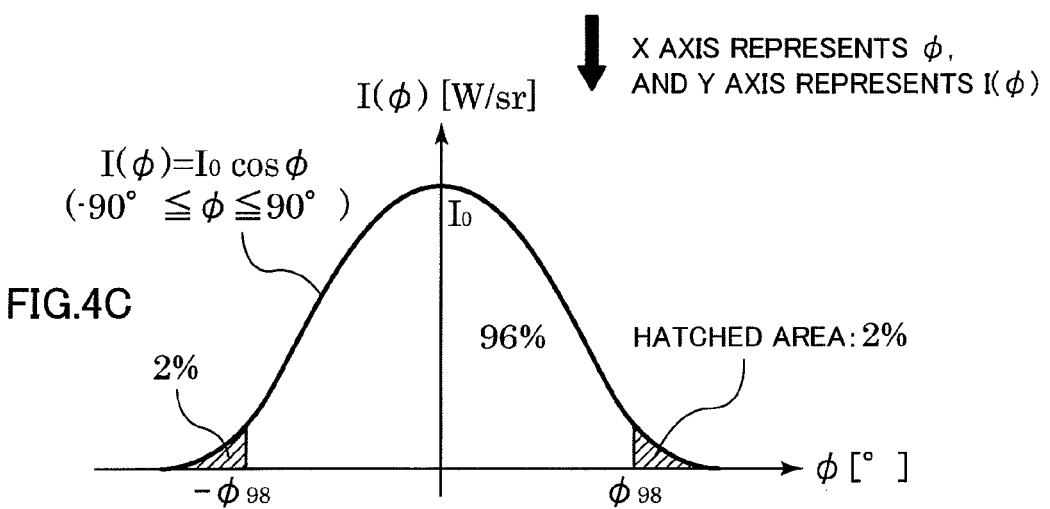
Figure 5A:
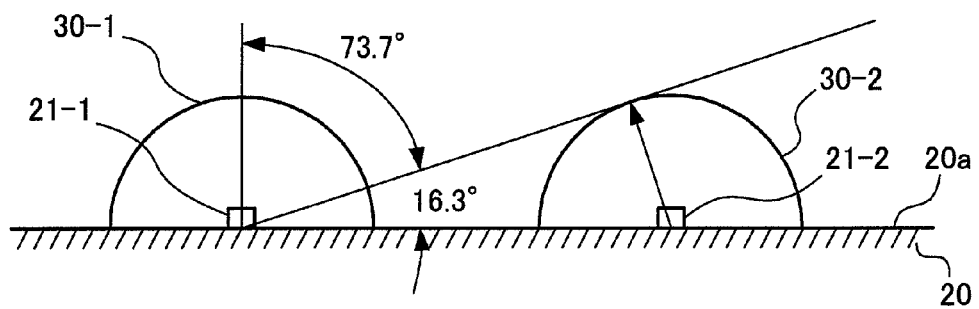
FIGS. 5A and 5B are views for explaining the relationship between the lenses adjacent to each other.
Figure 5B:
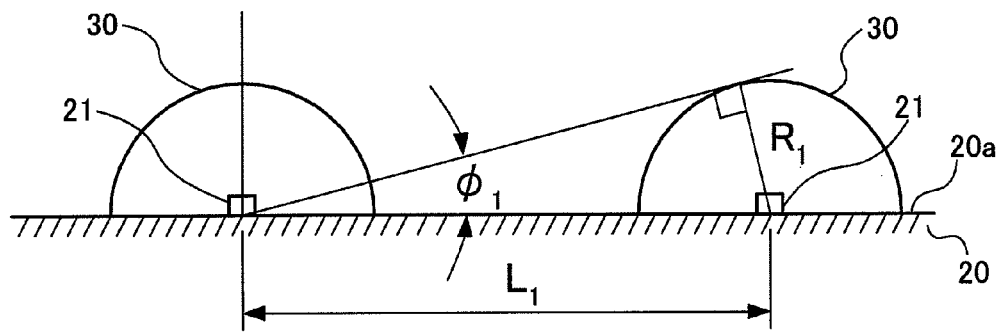

10 . . . backlight device, 11 . . . backlight frame, 12 . . . light-emitting module, 13 . . . diffusion plate, 20 . . . circuit board, 20a . . . surface, 21 . . . LED chip, 30 . . . lens, 50 . . . liquid crystal display module, 51 . . . liquid crystal panel

The invention claimed is:

1. A display device comprising:
   a display panel that displays an image;
   a substrate that is disposed on a back surface of the display panel;
   a plurality of solid-state light-emitting elements that are disposed in an array on the substrate and that emit light to the display panel; and
   a cover member of a hemispherical shape that is disposed on the substrate and that covers each of the plurality of solid-state light-emitting elements, wherein
   a following relationship is established:

$$R/0.281 \leq L,$$

where L denotes an array pitch of solid-state light-emitting elements in the closest proximity to each other from a center of one solid state light emitting element to a center of adjacent solid-state light-emitting element, constituting the plurality of solid-state light-emitting elements, and R denotes a radius of the cover member.

2. The display device according to claim 1, further comprising a diffusion plate that is disposed between the display panel and the substrate and that diffuses light emitted from the plurality of solid-state light-emitting elements, wherein
   a following relationship is established:

$$R/0.281 < L < D/2,$$

where D denotes a shortest distance between the plurality of solid-state light-emitting elements and the diffusion plate.

3. A display device comprising:
   a display panel that displays an image;
   a substrate that is disposed on a back surface of the display panel;
   a plurality of solid-state light-emitting elements that are disposed in an array on the substrate and that emit light to the display panel; and a cover member of a hemispherical shape that is disposed on the substrate and that covers each of the plurality of solid-state light-emitting elements, wherein a solid-state light-emitting element and an adjacent solid-state light-emitting element that is adjacent to the solid-state light-emitting element, which constitute the plurality of solid-state light-emitting elements, has a following relationship:

$$\phi \leq 16.3°,$$

where $\phi$ denotes an angle formed between a line segment that links a center of the solid-state light-emitting element and a center of the adjacent solid-state light-emitting element and wherein the centers of the solid-state light-emitting elements are on the surface of the substrate, and a line segment tangent to the cover member of the adjacent solid-state light-emitting element, which is drawn from the center of the solid-state light-emitting element.

4. A light-emitting device comprising:
a substrate;
a plurality of solid-state light-emitting elements that are disposed in an array on the substrate; and
a cover member of a hemispherical shape that is disposed on the substrate and that covers each of the plurality of solid-state light-emitting elements, wherein
a following relationship is established:

$$R/0.281 < L,$$

where L denotes an array pitch of solid-state light-emitting elements from a center of one solid-state light-emitting element to a center of adjacent solid-state light-emitting element constituting the plurality of solid-state light-emitting elements, and R denotes a radius of the cover member.

5. A light-emitting device comprising:
a substrate;
a plurality of solid-state light-emitting elements that are disposed in an array on the substrate; and
a cover member of a hemispherical shape that is disposed on the substrate and that covers each of the plurality of solid-state light-emitting elements, wherein
a solid-state light-emitting element and an adjacent solid-state light-emitting element that is adjacent to the solid-state light-emitting element, which constitute the plurality of solid-state light-emitting elements, has a following relationship:

$$\phi \leq 16.3°,$$

where $\phi$ denotes an angle formed between a line segment that links a center of the solid-state light-emitting element and a center of the adjacent solid-state light-emitting element, and a line segment tangent to the cover member of the adjacent solid-state light-emitting element, which is drawn from the center of the solid-state light-emitting element and wherein the centers of the solid-state light-emitting elements are on the surface of the substrate.

* * * * *